(12) United States Patent
Li

(10) Patent No.: US 11,552,664 B2
(45) Date of Patent: Jan. 10, 2023

(54) APPARATUS FOR SELF-GENERATING POWER AND WIRELESS SWITCH APPLYING SAME

(71) Applicant: CHANGZHOU CIGUANG NEW ENERGY TECHNOLOGY CO., LTD, Jiangsu (CN)

(72) Inventor: Chunguang Li, Jiangsu (CN)

(73) Assignee: Changzhou Ciguang New Energy Technology Co., Ltd., Jiangsu (CN)

( * ) Notice: Subject to any disclaimer, the term of this patent is extended or adjusted under 35 U.S.C. 154(b) by 50 days.

(21) Appl. No.: 17/381,292

(22) Filed: Jul. 21, 2021

(65) Prior Publication Data

US 2022/0116065 A1 Apr. 14, 2022

(30) Foreign Application Priority Data

Oct. 9, 2020 (CN) .......................... 202011073425.7

(51) Int. Cl.
*H02K 35/06* (2006.01)
*H04B 1/16* (2006.01)
*H01F 5/02* (2006.01)

(52) U.S. Cl.
CPC ............ *H04B 1/1607* (2013.01); *H01F 5/02* (2013.01); *H02K 35/06* (2013.01); *H01F 2005/027* (2013.01)

(58) Field of Classification Search
CPC .......................................... H02K 35/00–35/06
See application file for complete search history.

(56) References Cited

FOREIGN PATENT DOCUMENTS

CN 106451993 A * 2/2017

* cited by examiner

*Primary Examiner* — Ramon M Barrera
(74) *Attorney, Agent, or Firm* — Hunton Andrews Kurth LLP

(57) ABSTRACT

An apparatus for self-generating power and a wireless switch applying same are provided. The apparatus includes a coil assembly and a permanent magnet assembly. In an initial state, left and right ends of a soft magnetic plate come into contact with a first permanent magnet and a second upper soft magnetic plate respectively to form a first closed magnetic circuit, when the soft magnetic plate is rotated relative to the permanent magnet assembly, the left and the ends of the soft magnetic plate come into contact with a first upper soft magnetic plate and a second permanent magnet respectively to form a second closed magnetic circuit, and a direction of a magnetic line of force passing through the soft magnetic plate in the first closed magnetic circuit is opposite to that of a magnetic line of force passing through the soft magnetic plate in the second closed magnetic circuit.

18 Claims, 6 Drawing Sheets

APPARATUS FOR SELF-GENERATING POWER AND WIRELESS SWITCH APPLYING SAME

CROSS REFERENCE TO RELATED APPLICATION

This patent application claims the benefit and priority of Chinese Patent Application No. 202011073425.7 filed on Oct. 9, 2020, the disclosure of which is incorporated by reference herein in its entirety as part of the present application.

TECHNICAL FIELD

The present disclosure relates to an apparatus for generating power and a wireless switch with the apparatus for generating power, in particular to an apparatus for self-generating power and a wireless switch applying same.

BACKGROUND ART

With the development of science and technology, wireless controllers have been widely used in various household appliances. Accordingly, wireless switches for controlling the household appliances also have appeared. Existing wireless switches can be divided into battery-powered switches and self-powered (passive) switches, and the use of these wireless switches has brought great convenience to people's daily life. However, the existing wireless switches have many problems in use, for example, in the case of the battery-powered wireless switches, rechargeable batteries need to be installed and then taken out to be recharged frequently since the switches are in a state of wireless connection; as users often forget to recharge the rechargeable batteries, the appliances are misjudged as powered off when used, which causes inconvenience in use. For another example, the apparatus for self-generating power in the existing self-powered wireless switch has a complex magnetic circuit and is inconvenient to manufacture, which increases the manufacturing cost. For still another example, the apparatus for self-generating power in the existing self-powered wireless switch has low power generation efficiency, weak currents and insufficient power supply, leading to unstable control over the household appliances. For the last example, in the existing self-powered wireless switch, components used for assembly of a permanent magnet assembly (a permanent magnet and a soft magnetic frame) and a coil assembly (a soft magnetic plate and a coil) are complex in structure and inconvenient to manufacture.

SUMMARY

1. Technical Problems to be Solved by the Present Disclosure

An objective of the present disclosure is to overcome the above shortcomings and provide an apparatus for self-generating power and a wireless switch applying same. The technical solution of the present disclosure has advantages of simple structure and convenient connection. A permanent magnet assembly and a coil assembly themselves are composed of few components, such that a closed magnetic circuit formed by the permanent magnet assembly and the coil assembly in cooperation is simple, thereby greatly improving production efficiency, reducing manufacturing cost, realizing high power generation efficiency, and achieving strong and sufficient current.

2. Technical Solution

In order to achieve the above effect, the present disclosure provides the following technical solutions:

an apparatus for self-generating power includes a coil assembly and a permanent magnet assembly, wherein the coil assembly includes a soft magnetic plate and a coil, wherein the soft magnetic plate is arranged in an up-down rotation manner, and the coil is wound around a middle of the soft magnetic plate; the permanent magnet assembly includes a first soft magnetic frame, a first permanent magnet and a second permanent magnet, wherein the first soft magnetic frame includes a first upper soft magnetic plate, a first lower soft magnetic plate, a second lower soft magnetic plate, a second upper soft magnetic plate, a first front soft magnetic plate and a first rear soft magnetic plate, wherein the first front soft magnetic plate and the first rear soft magnetic plate are arranged on a front side and a rear side of the soft magnetic plate respectively, the first upper soft magnetic plate and the first lower soft magnetic plate are oppositely arranged on an upper side and a lower side of a left end of the soft magnetic plate respectively, a left end of the first upper soft magnetic plate, a left end of the first lower soft magnetic plate, a left end of the first front soft magnetic plate and a left end of the first rear soft magnetic plate are connected together through a first left soft magnetic plate, a front end and a rear end of the first upper soft magnetic plate are fixedly connected to an upper left end of the first front soft magnetic plate and an upper left end of the first rear soft magnetic plate respectively, a front end and a rear end of the first lower soft magnetic plate are fixedly connected to a lower left end of the first front soft magnetic plate and a lower left end of the first rear soft magnetic plate respectively, the second upper soft magnetic plate and the second lower soft magnetic plate are oppositely arranged on an upper side and a lower side of a right end of the soft magnetic plate respectively, a front end and a rear end of the second upper soft magnetic plate are fixedly connected to an upper right end of the first front soft magnetic plate and an upper right end of the first rear soft magnetic plate respectively, and a front end and a rear end of the second lower soft magnetic plate are fixedly connected to a lower right end of the first front soft magnetic plate and a lower right end of the first rear soft magnetic plate respectively; the first permanent magnet is attracted to the first lower soft magnetic plate, the second permanent magnet is attracted to the second lower soft magnetic plate, or the first permanent magnet is attracted to the first lower soft magnetic plate and the second permanent magnet is attracted to the first upper soft magnetic plate; and in an initial state, the left end and the right end of the soft magnetic plate come into contact with the first permanent magnet and the second upper soft magnetic plate respectively to form a first closed magnetic circuit, and when the soft magnetic plate is rotated relative to the permanent magnet assembly, the left end and the right end of the soft magnetic plate come into contact with the first upper soft magnetic plate and the second permanent magnet respectively to form a second closed magnetic circuit, a direction of a magnetic line of force passing through the soft magnetic plate in the first closed magnetic circuit is opposite to that of a magnetic line of force passing through the soft magnetic plate in the second closed magnetic circuit; or in the initial state, the left end and the right end of the soft magnetic plate come into contact with the first permanent magnet and the second upper soft magnetic plate respectively to form a third closed magnetic circuit, and when the soft magnetic plate is rotated relative to the permanent magnet assembly, the left end and the right end of the soft magnetic plate come into contact with the second permanent magnet and the second lower soft magnetic plate respectively to form a fourth closed magnetic circuit, a direction of a magnetic line of force passing through the soft magnetic plate in the third closed magnetic circuit is opposite to that of a magnetic line of force passing through the soft magnetic plate in the fourth closed magnetic circuit.

Further, the first upper soft magnetic plate and the second lower soft magnetic plate are both arranged obliquely with left higher than right, and the first lower soft magnetic plate and the second upper soft magnetic plate are both arranged obliquely with left lower than right.

Further, the first left soft magnetic plate is provided with a first hole for preventing the first left soft magnetic plate from interacting with the left end of the soft magnetic plate.

Further, a toggle sleeve sleeves a toggle end of the soft magnetic plate, wherein two connection arms of the toggle sleeve are separately hinged on the first front soft magnetic plate and the first rear soft magnetic plate, and the toggle sleeve is provided with a flat spring.

An apparatus for self-generating power of the present disclosure includes a coil assembly and a permanent magnet assembly, wherein the coil assembly includes a soft magnetic plate and a coil, wherein the soft magnetic plate is arranged in an up-down rotation manner, and the coil is wound around a middle of the soft magnetic plate; the permanent magnet assembly includes a second soft magnetic frame, a first permanent magnet and a second permanent magnet, wherein the second soft magnetic frame comprises a third upper soft magnetic plate, a third lower soft magnetic plate, a fourth lower soft magnetic plate and a fourth upper soft magnetic plate, wherein the third upper soft magnetic plate and the third lower soft magnetic plate are oppositely arranged on an upper side and a lower side of a left end of the soft magnetic plate respectively, a left end of the third upper soft magnetic plate and a left end of the third lower soft magnetic plate are connected through a second left soft magnetic plate, the third lower soft magnetic plate and fourth lower soft magnetic plate are connected through a first lower soft magnetic plate, the fourth lower soft magnetic plate and the fourth upper soft magnetic plate are oppositely arranged on an upper side and a lower side of a right end of the soft magnetic plate, a rear end of the fourth lower soft magnetic plate and a rear end of the fourth upper soft magnetic plate are connected through a second rear soft magnetic plate, and a front end of the fourth lower soft magnetic plate and a front end of the fourth upper soft magnetic plate are connected through a second front soft magnetic plate; the first permanent magnet is attracted to a lower surface of the third lower soft magnetic plate, and the second permanent magnet is attracted to an upper surface of the third upper soft magnetic plate; and in an initial state, the left end and the right end of the soft magnetic plate come into contact with the fourth upper soft magnetic plate and the first permanent magnet respectively to form a fifth closed magnetic circuit, and when the soft magnetic plate is rotated relative to the permanent magnet assembly, the left end and the right end of the soft magnetic plate come into contact with the fourth lower soft magnetic plate and the second permanent magnet to form a sixth closed magnetic circuit, and a direction of a magnetic line of force passing through the soft magnetic plate in the fifth closed magnetic circuit is opposite to that of a magnetic line of force passing through the soft magnetic plate in the sixth closed magnetic circuit.

Further, the third upper soft magnetic plate and the fourth lower soft magnetic plate are both arranged obliquely with left higher than right, and the third lower soft magnetic plate and the second upper soft magnetic plate are both arranged obliquely with left lower than right.

Further, a toggle sleeve sleeves a toggle end of the soft magnetic plate, wherein two connection arms of the toggle sleeve are separately hinged on the second rear soft magnetic plate and the second front soft magnetic plate, and the toggle sleeve is provided with a flat spring.

Further, the first lower soft magnetic plate is provided with an opening for the coil to be wound.

Further, the second left soft magnetic plate is provided with a second hole for preventing the second left soft magnetic plate from interacting with the left end of the soft magnetic plate.

A wireless switch of the present disclosure includes a radio frequency control board, a switch body configured to control an electric device, and the apparatus for self-generating power, wherein the coil of the apparatus for self-generating power is electrically connected to the radio frequency control board.

3. Beneficial Effects

Compared with the prior art, the technical solutions provided by the present disclosure have the following beneficial effects:

(1) according to the apparatus for self-generating power of the present disclosure, the direction of the magnetic line of force passing through the soft magnetic plate is changed by controlling the soft magnetic plate to rotate up and down relative to the permanent magnet assembly, the coil generates power according to an electromagnetic induction principle, and since the closed magnetic circuit is formed, a magnetic flux passing through the coil is maximized to realize high power generation efficiency and achieve strong current and sufficient power;

(2) according to the apparatus for self-generating power of the present disclosure, the permanent magnet assembly and the coil assembly themselves are composed of few components, and the closed magnetic circuit formed by the permanent magnet assembly and the coil assembly in cooperation is simple and quick to manufacture, thereby greatly improving the production efficiency and reducing the manufacturing cost;

(3) according to the apparatus for self-generating power of the present disclosure, the third upper soft magnetic plate and the fourth lower soft magnetic plate are both arranged obliquely with the left higher than the right, and the third lower soft magnetic plate and the second upper soft magnetic plate are both arranged obliquely with the left lower than the right, or the first upper soft magnetic plate and the second lower soft magnetic plate are both arranged obliquely with the left higher than the right, and the first lower soft magnetic plate and the second upper soft magnetic plate are both arranged obliquely with the left lower than the right, which greatly increases a contact area with the soft magnetic plate, and greatly increases power generation; and (4) according to the apparatus for self-generating power of the present disclosure, the left soft magnetic plate is arranged, thereby increasing a return magnetic circuit and greatly increasing the power generation.

Figure 1:
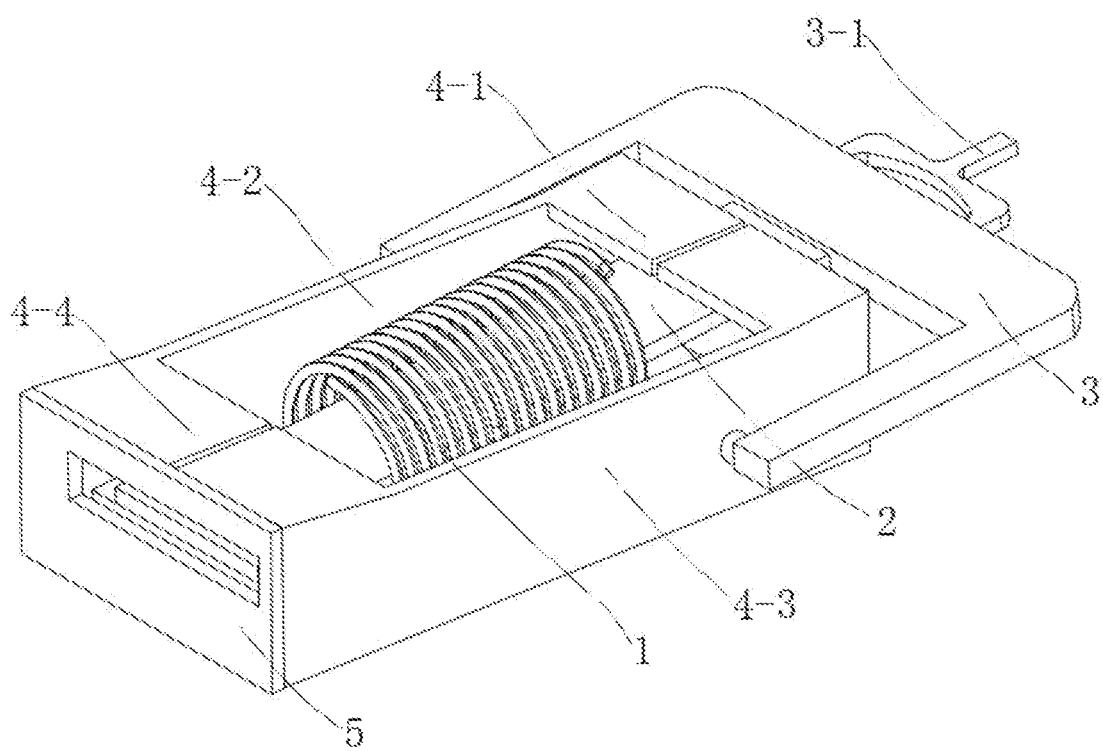
FIG. 1 is a schematic structural diagram of embodiment 1 of an apparatus for self-generating power of the present disclosure.

Reference numerals in the schematic diagrams: 1. coil; 2. soft magnetic plate; 3. toggle sleeve; 3-1. flat spring; 4-1. second upper soft magnetic plate; 4-2. first rear soft magnetic plate; 4-3. first front soft magnetic plate; 4-4. first upper soft magnetic plate; 4-5. first lower soft magnetic plate; 4-6. second lower soft magnetic plate; 5. first left soft magnetic plate; 5-1. first hole; 6. first permanent magnet; 7. second permanent magnet; 8-1. first coil winding block; 8-1-1. first intermediate movable cavity; 8-2. first support block; 8-3. second support block; 9-1. second coil winding block; 9-1-1. second intermediate movable cavity; 9-2. third support block; 10-1. fourth upper soft magnetic plate; 10-2. fourth lower soft magnetic plate; 10-3. third upper soft magnetic plate; 10-4. third lower soft magnetic plate; 10-5. second left soft magnetic plate; 10-6. first lower soft magnetic plate; 10-6-1. opening; 10-7. second front soft magnetic plate; 10-8. second rear soft magnetic plate; 11. third coil holder; and 11-1. third movable cavity.

DETAILED DESCRIPTION OF THE EMBODIMENTS

In order to further understand the content of the present disclosure, the present disclosure will be described in detail with reference to companying drawings and in conjunction with embodiments.

Embodiment 1

With reference to FIG. 1, an apparatus for self-generating power of this embodiment includes a coil assembly and a permanent magnet assembly, wherein the coil assembly includes a soft magnetic plate 2 and a coil 1. The soft magnetic plate 2 is arranged in an up-down rotation manner, and the coil 1 is wound around a middle of the soft magnetic plate 2.

The permanent magnet assembly includes a first soft magnetic frame, a first permanent magnet 6 and a second permanent magnet 7. The first soft magnetic frame includes a first upper soft magnetic plate 4-4, a first lower soft magnetic plate 4-5, a second lower soft magnetic plate 4-6, a second upper soft magnetic plate 4-1, a first front soft magnetic plate 4-3 and a first rear soft magnetic plate 4-2. The first front soft magnetic plate 4-3 and the first rear soft magnetic plate 4-2 are arranged on a front side and a rear side of the soft magnetic plate 2 respectively, the first upper soft magnetic plate 4-4 and the first lower soft magnetic plate 4-5 are oppositely arranged on an upper side and a lower side of a left end of the soft magnetic plate 2 respectively, a front end and a rear end of the first upper soft magnetic plate 4-4 are fixedly connected to an upper left end of the first front soft magnetic plate 4-3 and an upper left end of the first rear soft magnetic plate 4-2 respectively, a front end and a rear end of the first lower soft magnetic plate 4-5 are fixedly connected to a lower left end of the first front soft magnetic plate 4-3 and a lower left end of the first rear soft magnetic plate 4-2 respectively, the second upper soft magnetic plate 4-1 and the second lower soft magnetic plate 4-6 are oppositely arranged on an upper side and a lower side of a right end of the soft magnetic plate 2 respectively, a front end and a rear end of the second upper soft magnetic plate 4-1 are fixedly connected to an upper right end of the first front soft magnetic plate 4-3 and an upper right end of the first rear soft magnetic plate 4-2 respectively, and a front end and a rear end of the second lower soft magnetic plate 4-6 are fixedly connected to a lower right end of the first front soft magnetic plate 4-3 and a lower right end of the first rear soft magnetic plate 4-2 respectively. The first permanent magnet 6 is attracted to the first lower soft magnetic plate 4-5, and the second permanent magnet 7 is attracted to the second lower soft magnetic plate 4-6.

In an initial state, the left end and the right end of the soft magnetic plate 2 come into contact with the first permanent magnet 6 and the second upper soft magnetic plate 4-1 respectively to form a first closed magnetic circuit. In order to increase a contact area between the left end of the soft magnetic plate 2 and the first permanent magnet 6 and a contact area between the right end of the soft magnetic plate 2 and the second upper soft magnetic plate 4-1, the first lower soft magnetic plate 4-5 and the second upper soft magnetic plate 4-1 are both arranged obliquely with left lower than right. When the soft magnetic plate 2 is rotated relative to the permanent magnet assembly, the left end and the right end of the soft magnetic plate 2 come into contact with the first upper soft magnetic plate 4-4 and the second permanent magnet 7 respectively to form a second closed magnetic circuit. In order to increase a contact area between the left end of the soft magnetic plate 2 and the first upper soft magnetic plate 4-4 and a contact area between the right end of the soft magnetic plate 2 and the second permanent magnet 7, the first upper soft magnetic plate 4-4 and the second lower soft magnetic plate 4-6 are both arranged obliquely with left higher than right. A direction of a magnetic line of force passing through the soft magnetic plate 2 in the first closed magnetic circuit is opposite to that of a magnetic line of force passing through the soft magnetic plate 2 in the second closed magnetic circuit. The direction of the magnetic line of force passing through the soft magnetic plate 2 is changed by controlling the soft magnetic plate 2 to rotate up and down relative to the permanent magnet assembly. The coil generates power according to an electromagnetic induction principle, and since the closed magnetic circuit is formed, a magnetic flux passing through the coil is maximized to realize high power generation efficiency and achieve strong current and sufficient power.

With further reference to FIG. 1, since the first front soft magnetic plate 4-3 and the first rear soft magnetic plate 4-2 are direct connection portions connected with N-poles and S-poles of the two permanent magnets, and each are a section of return magnetic circuit in the closed magnetic circuit as well, for example, after magnetic lines of force from the N-pole of the first permanent magnet pass through the soft magnetic plate, a portion of return magnetic lines of force converge into the S-pole of the second permanent magnet through the first front soft magnetic plate and the first rear soft magnetic plate, and another portion of the return magnetic lines of force converge into the S-pole of the first permanent magnet through the first front soft magnetic plate and the first rear soft magnetic plate, which causes the return magnetic lines of force reduced and power generation reduced. In order to increase the power generation, a left end of the first upper soft magnetic plate 4-4, a left end of the first lower soft magnetic plate 4-5, a left end of the first front soft magnetic plate 4-3 and a left end of the first rear soft magnetic plate 4-2 are connected together through a first left soft magnetic plate 5. The first left soft magnetic plate 5 is added, so as to increase the return magnetic circuit, and therefore increase the return magnetic line of force and the power generation. In this embodiment, in order to prevent a condition that the power generation is influenced due to the fact that a distance between the left end of the soft magnetic plate 2 and the first left soft magnetic plate 5 is too close when the soft magnetic plate 2 is rotated up and down to generate power, the first left soft magnetic plate 5 is provided with a first hole 5-1 for preventing the first left soft magnetic plate 5 from interacting with the left end of the soft magnetic plate 2.

In this embodiment, the first soft magnetic frame is of an integrally formed structure, that is, formed by bending a whole plate. The first upper soft magnetic plate 4-4, the first lower soft magnetic plate 4-5, the left end of the first front soft magnetic plate 4-3 and the left end of the first rear soft magnetic plate 4-2 define a first annular structure, the second lower soft magnetic plate 4-6, the second upper soft magnetic plate 4-1, a right end of the first front soft magnetic plate 4-3 and a right end of the first rear soft magnetic plate 4-2 define a second annular structure, a right side surface of the first annular structure, the first front soft magnetic plate 4-3, the first rear soft magnetic plate 4-2 and a left side surface of the second annular structure define a third annular structure. The permanent magnet assembly and the coil assembly themselves are composed of few components, and the closed magnetic circuit formed by the permanent magnet assembly and the coil assembly in cooperation is simple and quick to manufacture, thereby greatly improving production efficiency and reducing manufacturing cost.

Figure 2:
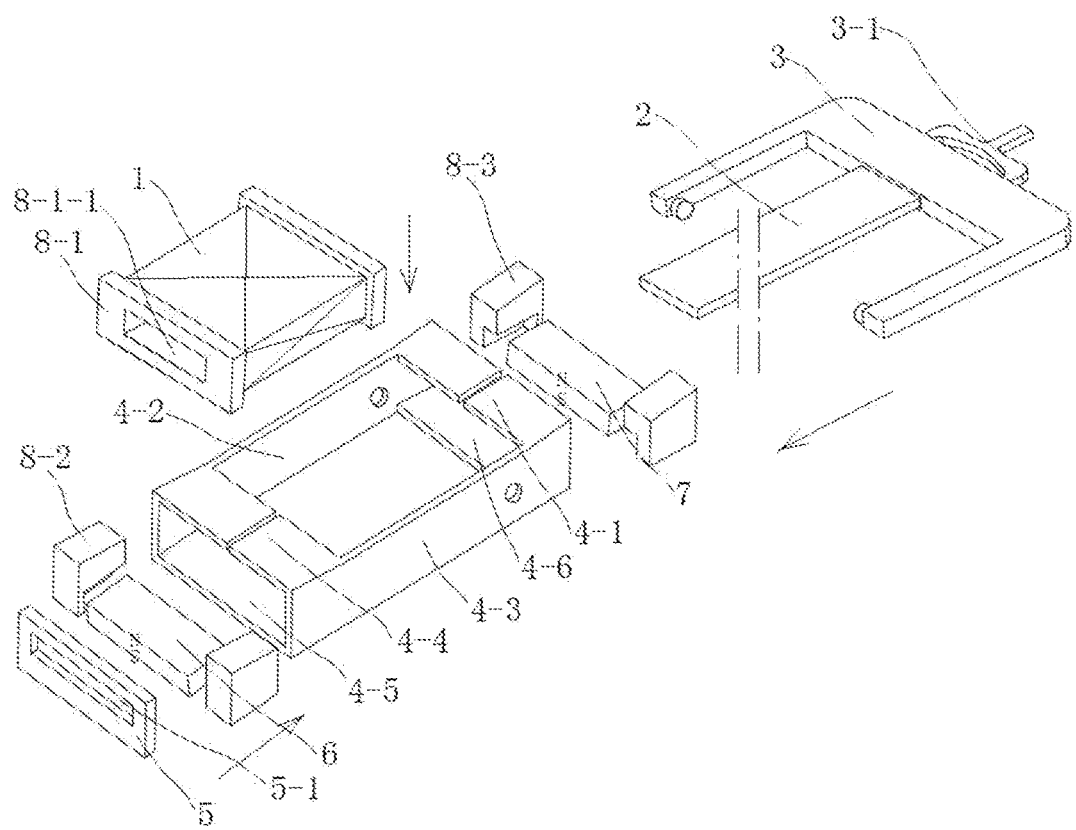
FIG. 2 is an exploded view of embodiment 1 of the apparatus for self-generating power of the present disclosure.
Figure 3:
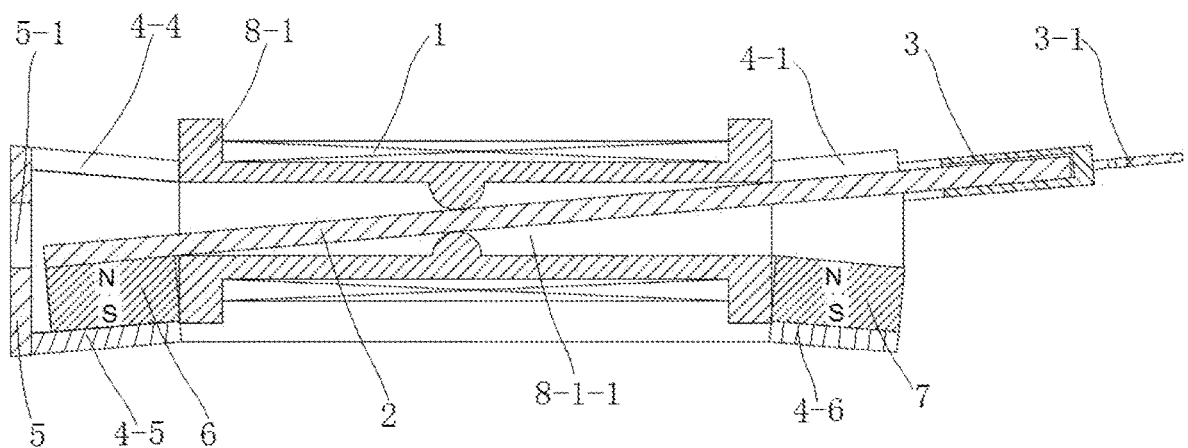
FIG. 3 is a sectional view of embodiment 1 of the apparatus for self-generating power of the present disclosure.

With further reference to FIG. 2 and FIG. 3, in order to assemble the permanent magnet assembly and the coil assembly together, the apparatus further includes a first coil holder. In this embodiment, since the first soft magnetic frame is of an integrally formed structure, the first coil holder is of a split structure. The first coil holder includes a first coil winding block 8-1 configured to wind the coil. The first coil winding block 8-1 is arranged and fixed in the third annular structure with various specific fixing means, for example through a buckle structure or a limitation structure. A left side of the first coil winding block 8-1 is provided with two first support blocks 8-2 which are oppositely arranged front and rear. The two first support blocks 8-2 are sandwiched between a front end and a rear end of the first permanent magnet 6 to be clamped into the first annular structure and abut against the first coil winding block 8-1. A right side of the first coil winding block 8-1 is provided with two second support blocks 8-3 which are oppositely arranged front and rear. The two second support blocks 8-3 are sandwiched between a front end and a rear end of the second permanent magnet 7 to be clamped into the second annular structure and abut against the first coil winding block 8-1. A distance between the first permanent magnet 6 and the first upper soft magnetic plate 4-4 is equal to a distance between the second permanent magnet 7 and the second upper soft magnetic plate 4-5. Since the first upper soft magnetic plate 4-4, the first lower soft magnetic plate 4-5, the second lower soft magnetic plate 4-6 and the second upper soft magnetic plate 4-1 are all obliquely arranged, the first annular structure match upper side surfaces and lower side surfaces of the two first support blocks 8-2 in an inclined plane manner, and the second annular structure match upper side surfaces and lower side surfaces of the two second support blocks 8-3 in an inclined plane manner, such that the two first support blocks 8-2 and the two second support blocks 8-3 are mounted properly. The first left soft magnetic plate 5 is clamped in the first annular structure, such that the left end of the first upper soft magnetic plate 4-4, the left end of the first lower soft magnetic plate 4-5, the left end of the first front soft magnetic plate 4-3 and the left end of the first rear soft magnetic plate 4-2 are connected together through the first left soft magnetic plate 5, and the first left soft magnetic plate 5 is magnetically fixed by the first permanent magnet 6. The first coil winding block 8-1 is provided with a first intermediate movable cavity 8-1-1 which penetrates the first coil winding block left and right, a first left movable cavity is formed between the two first support blocks 8-2, a right movable cavity is formed between the two second support blocks 8-3, and the right movable cavity, the first intermediate movable cavity 8-1-1 and the first left movable cavity form a first movable cavity for the soft magnetic plate 2 to pass therethrough to move up and down. The soft magnetic plate 2 is arranged in the first movable cavity in an up-down rotation manner, and a toggle end of the soft magnetic plate penetrates out of a position between the second permanent magnet and the second upper soft magnetic plate. An inner wall of the first intermediate movable cavity is provided with two first fulcrum portions which are right opposite to each other and serve as rotating fulcrums of the soft magnetic plate. In order to toggle the soft magnetic plate more conveniently and labor-saving, the toggle end of the soft magnetic plate 2 is sleeved with a toggle sleeve 3. Two connection arms of the toggle sleeve 3 are separately hinged on the first front soft magnetic plate 4-3 and the first rear soft magnetic plate 4-2, and the toggle sleeve 3 is provided with a flat spring 3-1.

A wireless switch of this embodiment includes a radio frequency control board, a switch body configured to control an electric device and the apparatus for self-generating power, wherein the coil 1 of the apparatus for self-generating power is electrically connected to the radio frequency control board, and the coil 1 in the apparatus for self-generating power generates currents to supply power to the radio frequency control board, thereby realizing passive wireless switch control. A rocker wireless switch is suitable to make into by using the apparatus for self-generating power of this embodiment.

Embodiment 2

Figure 4:
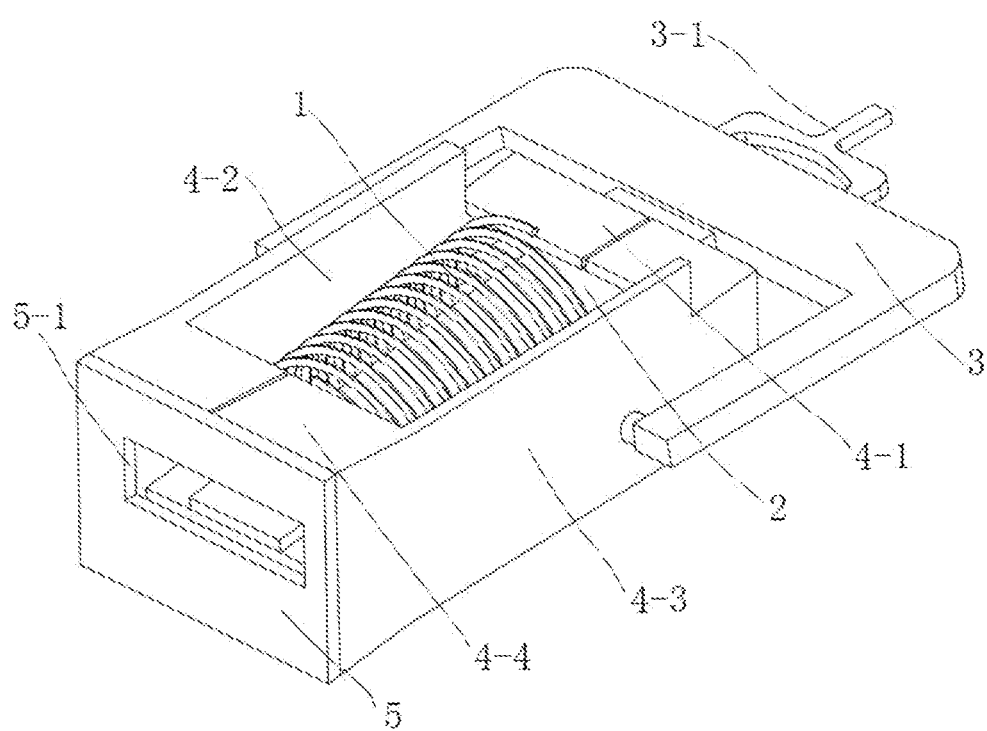
FIG. 4 is a schematic structural diagram of embodiment 2 of an apparatus for self-generating power of the present disclosure.

With reference to FIG. 4, a basic structure of an apparatus for self-generating power of this embodiment is the same as that of embodiment 1, except that the first permanent magnet 6 is attracted to the first lower soft magnetic plate 4-5, the second permanent magnet 7 is attracted to the first upper soft magnetic plate 4-4, and a distance between the first permanent magnet 6 and the second permanent magnet 7 is equal to a distance between the second upper soft magnetic plate 4-1 and the second lower soft magnetic plate 4-6.

In an initial state, the left end and the right end of the soft magnetic plate 2 come into contact with the first permanent magnet 6 and the second upper soft magnetic plate 4-1 respectively to form a third closed magnetic circuit, when the soft magnetic plate 2 is rotated relative to the permanent magnet assembly, the left end and the right end of the soft magnetic plate 2 come into contact with the second permanent magnet 7 and the second lower soft magnetic plate 4-6 to form a fourth closed magnetic circuit, and a direction of a magnetic line of force passing through the soft magnetic plate 2 in the third closed magnetic circuit is opposite to that of a magnetic line of force passing through the soft magnetic plate 2 in the fourth closed magnetic circuit.

Figure 5:
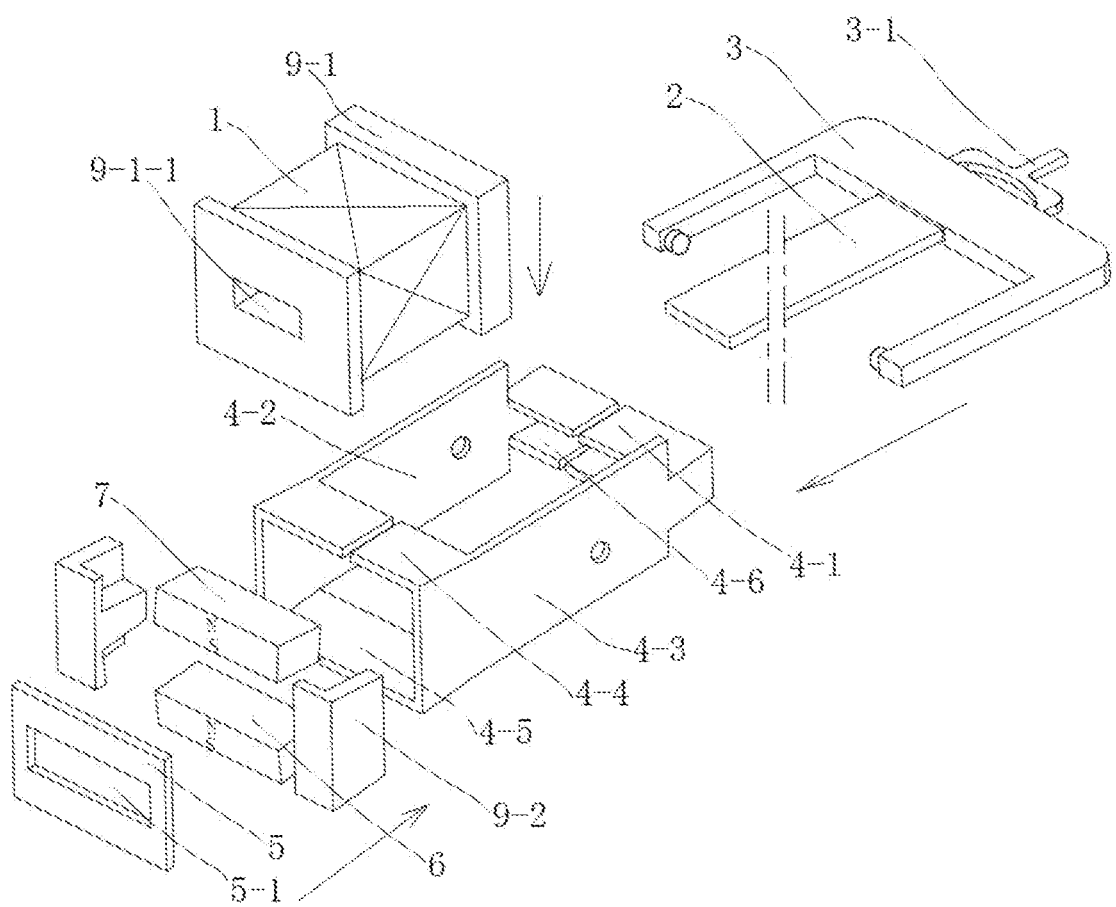
FIG. 5 is an exploded view of embodiment 2 of the apparatus for self-generating power of the present disclosure.
Figure 6:
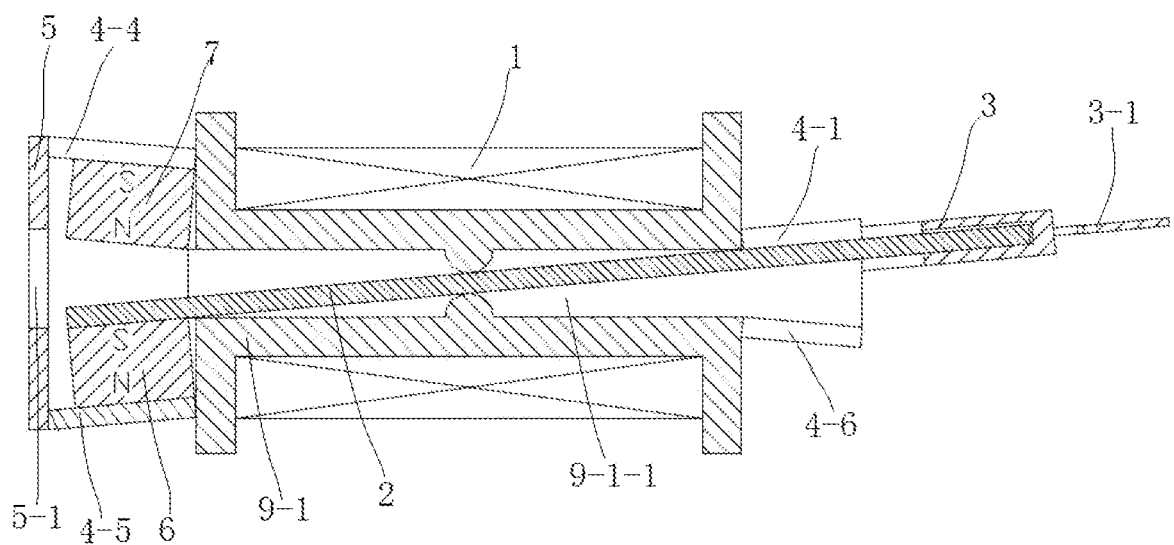
FIG. 6 is a sectional view of embodiment 2 of the apparatus for self-generating power of the present disclosure.

With further reference to FIG. 5 and FIG. 6, in order to assemble the permanent magnet assembly and the coil assembly together, the apparatus further includes a second coil holder. In this embodiment, the second coil holder is of a split structure. The second coil holder includes a second coil winding block 9-1 configured to wind the coil. The second coil winding block 9-1 is arranged and fixed in the third annular structure. A left side of the second coil winding block 9-1 is provided with two third support blocks 9-2 which are oppositely arranged front and rear. The second permanent magnet 7 and the first permanent magnet 6 are sandwiched between the two third support blocks 9-2 to be clamped into the first annular structure and abut against the second coil winding block 9-1. Since the first upper soft magnetic plate 4-4 and the first lower soft magnetic plate 4-5 are both obliquely arranged, the first annular structure match upper side surfaces and lower side surfaces of the two third support blocks 9-2 in an inclined plane manner, such that the two third support blocks 9-2 are mounted properly. The first left soft magnetic plate 5 is clamped in the first annular structure, such that the left end of the first upper soft magnetic plate 4-4, the left end of the first lower soft magnetic plate 4-5, the left end of the first front soft magnetic plate 4-3 and the left end of the first rear soft magnetic plate 4-2 are connected together through the first left soft magnetic plate 5, and the first left soft magnetic plate 5 is magnetically fixed by the first permanent magnet 6 and the second permanent magnet 7. The second coil winding block 9-1 is provided with a second intermediate movable cavity 9-1-1 which penetrates the second coil winding block to left and right, a second left movable cavity is formed between the two third support blocks 9-2, and the second left movable cavity and the second intermediate movable cavity 9-1-1 form a second movable cavity for the soft magnetic plate 2 to pass therethrough to move up and down. The soft magnetic plate is arranged in the second movable cavity in the up-down rotation manner, and the toggle end of the soft magnetic plate penetrates out of the position between the second lower soft magnetic plate and the second upper soft magnetic plate. An inner wall of the second intermediate movable cavity 9-1-1 is provided with two second fulcrum portions which are right opposite to each other and serve as rotating fulcrums of the soft magnetic plate 2. In order to toggle the soft magnetic plate 2 more conveniently and labor-saving, the toggle end of the soft magnetic plate 2 is sleeved with a toggle sleeve 3. The two connection arms of the toggle sleeve 3 are separately hinged on the first front soft magnetic plate 4-3 and the first rear soft magnetic plate 4-2, and the toggle sleeve 3 is provided with the flat spring 3-1.

A wireless switch of this embodiment includes a radio frequency control board, a switch body configured to control an electric device and the apparatus for self-generating power, wherein the coil of the apparatus for self-generating power is electrically connected to the radio frequency control board, and the coil in the apparatus for self-generating power generates currents to supply power to the radio frequency control board, thereby realizing passive wireless switch control. A reset wireless switch is suitable to make into by using the apparatus for self-generating power of this embodiment.

Embodiment 3

Figure 7:
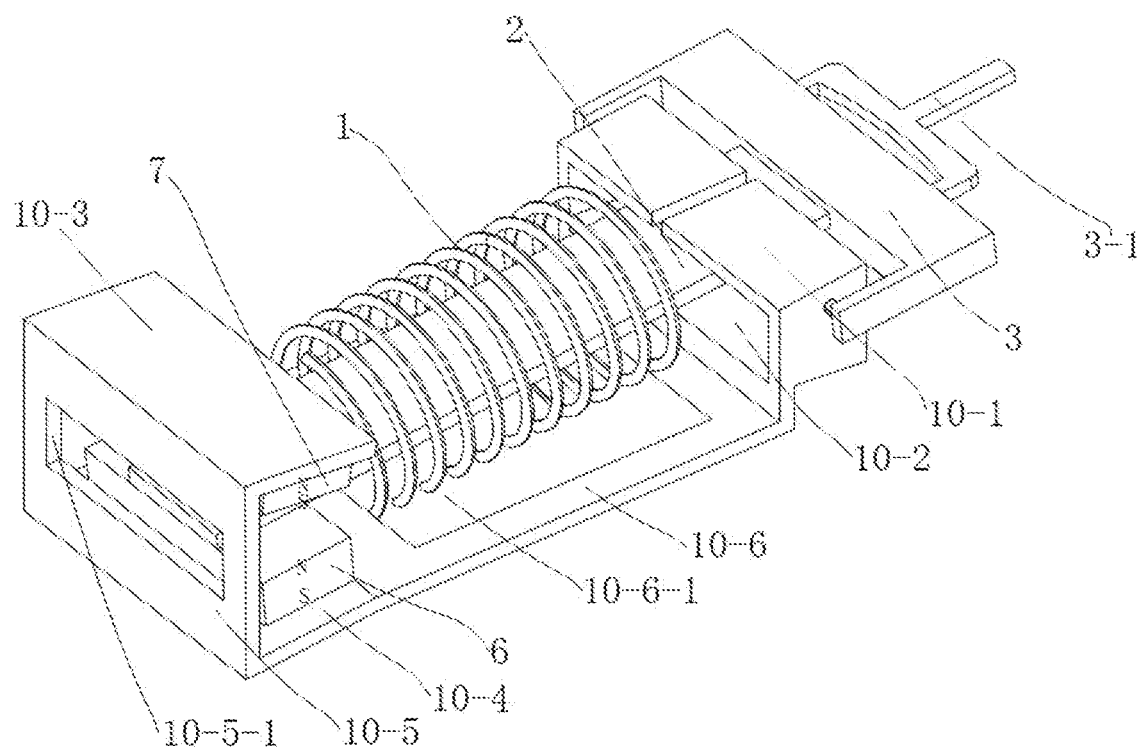
FIG. 7 is a schematic structural diagram of embodiment 3 of an apparatus for self-generating power of the present disclosure.

With reference to FIG. 7, an apparatus for self-generating power of this embodiment includes a coil assembly and a permanent magnet assembly, wherein the coil assembly includes a soft magnetic plate 2 and a coil 1. The soft magnetic plate 2 is arranged in an up-down rotation manner, and the coil 1 is wound around a middle of the soft magnetic plate 2. The permanent magnet assembly includes a second soft magnetic frame, a first permanent magnet 6 and a second permanent magnet 7. The second soft magnetic frame includes a third upper soft magnetic plate 10-3, a third lower soft magnetic plate 10-4, a fourth lower soft magnetic plate 10-2 and a fourth upper soft magnetic plate 10-1. The third upper soft magnetic plate 10-3 and the third lower soft magnetic plate 10-4 are oppositely arranged on an upper side and a lower side of a left end of the soft magnetic plate 2 respectively, and a left end of the third upper soft magnetic plate 10-3 and a left end of the third lower soft magnetic plate are connected through a second left soft magnetic plate 10-5. In order to avoid a condition that a magnetic circuit is influenced due to the fact that a distance between the left end of the soft magnetic plate and the second left soft magnetic plate 10-5 is too close, the second left soft magnetic plate 10-5 is provided with a second hole 10-5-1. The third lower soft magnetic plate 10-4 and the fourth lower soft magnetic plate 10-2 are connected through a first lower soft magnetic plate 10-6. In this embodiment, in order to make the coil 1 to be wound more turns, the first lower soft magnetic plate 10-6 is provided with an opening 10-6-1 for the coil 1 to be wound. The fourth lower soft magnetic plate 10-2 and the fourth upper soft magnetic plate 10-1 are oppositely arranged on an upper side and a lower side of a right end of the soft magnetic plate 2, a rear end of the fourth lower soft magnetic plate 10-2 and a rear end of the fourth upper soft magnetic plate 10-1 are connected through a second rear soft magnetic plate 10-8, and a front end of the fourth lower soft magnetic plate 10-2 and a front end of the fourth upper soft magnetic plate 10-1 are connected through a second front soft magnetic plate 10-7. The first permanent magnet 6 is attracted to a lower surface of the third lower soft magnetic plate 10-4, and the second permanent magnet 7 is attracted to an upper surface of the third upper soft magnetic plate 10-3. A distance between the first permanent magnet 6 and the second permanent magnet 7 is equal to a distance between the fourth upper soft magnetic plate 10-1 and the fourth lower soft magnetic plate 10-2.

In an initial state, the left end and the right end of the soft magnetic plate 2 come into contact with the fourth upper soft magnetic plate 10-1 and the first permanent magnet 6 respectively to form a fifth closed magnetic circuit. In order to increase a contact area between the left end of the soft magnetic plate 2 and the fourth upper soft magnetic plate 10-1 and a contact area between the right end of the soft magnetic plate 2 and the first permanent magnet 6, the fourth upper soft magnetic plate 10-1 and the third lower soft magnetic plate 10-4 are both arranged obliquely with left lower than right. When the soft magnetic plate 2 is rotated relative to the permanent magnet assembly, the left end and the right end of the soft magnetic plate 2 come into contact with the fourth lower soft magnetic plate 10-2 and the second permanent magnet 7 to form a sixth closed magnetic circuit. In order to increase a contact area between the left end of the soft magnetic plate 2 and the fourth lower soft magnetic plate 10-2 and a contact area between the right end of the soft magnetic plate 2 and the second permanent magnet 7, the third upper soft magnetic plate 10-3 and the fourth lower soft magnetic plate 10-2 are both arranged obliquely with left higher than right. A direction of a magnetic line of force passing through the soft magnetic plate 2 in the fifth closed magnetic circuit is opposite to that of a magnetic line of force passing through the soft magnetic plate 2 in the sixth closed magnetic circuit. The direction of the magnetic line of force passing through the soft magnetic plate is changed by controlling the soft magnetic plate 2 to rotate up and down relative to the permanent magnet assembly. The coil generates power according to an electromagnetic induction principle, and since the closed magnetic circuit is formed, a magnetic flux passing through the coil is maximized to realize high power generation efficiency, and achieve strong current and sufficient power.

Further in this embodiment, the second soft magnetic frame is of an integrally formed structure, that is, formed by bending a whole plate. The fourth upper soft magnetic plate 10-1, the fourth lower soft magnetic plate 10-2, the second rear soft magnetic plate 10-8 and the second front soft magnetic plate 10-7 define a fourth annular structure, and the third upper soft magnetic plate 10-3, the third lower soft magnetic plate 10-4 and the second left soft magnetic plate 10-5 define a C-shaped structure. The permanent magnet assembly and the coil assembly themselves are composed of few components, and the closed magnetic circuit formed by the permanent magnet assembly and the coil assembly in cooperation is simple and quick to manufacture, thereby greatly improving production efficiency and reducing manufacturing cost.

Figure 8:
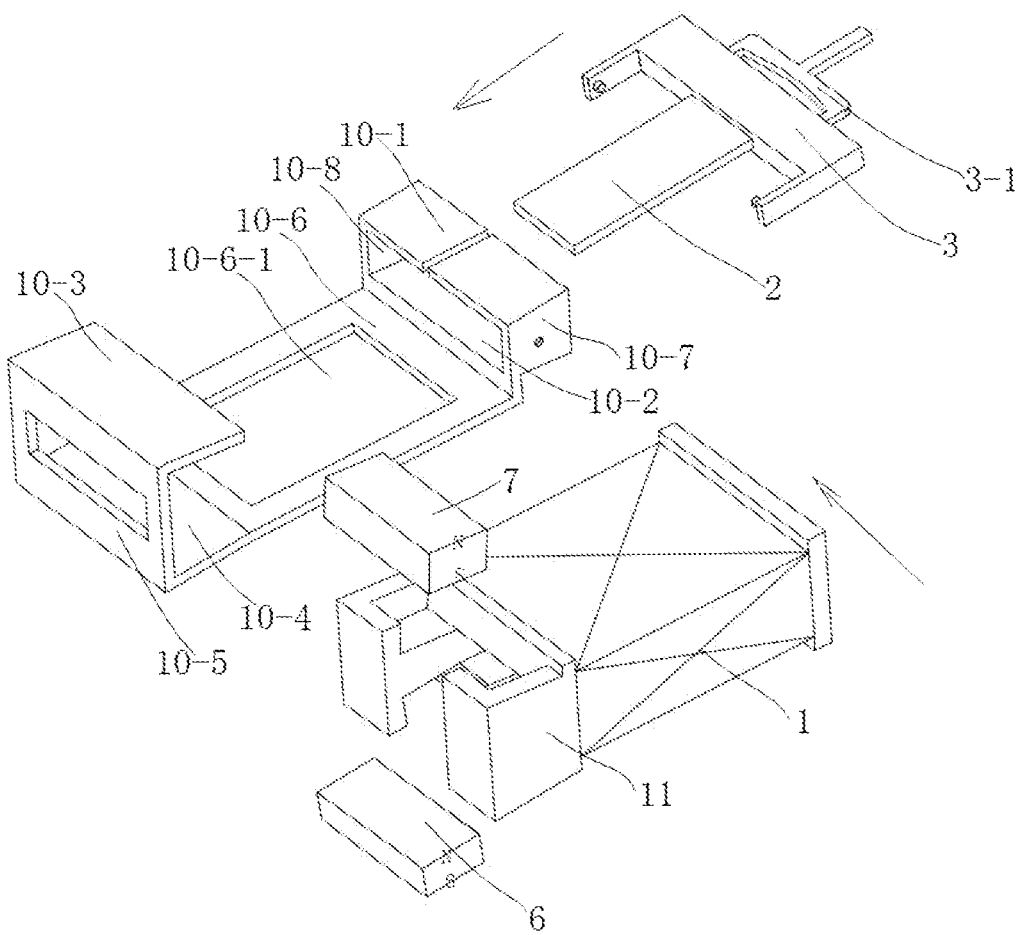
FIG. 8 is an exploded view of embodiment 3 of the apparatus for self-generating power of the present disclosure.
Figure 9:
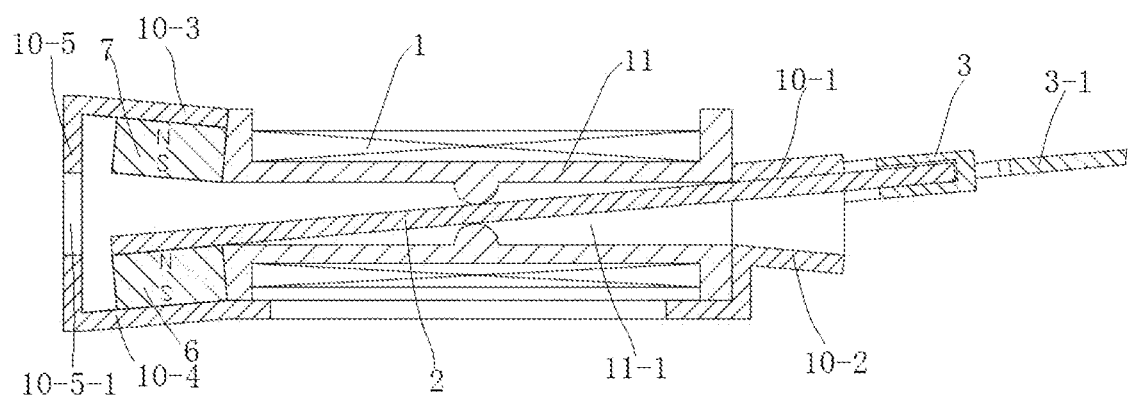
FIG. 9 is a sectional view of embodiment 3 of the apparatus for self-generating power of the present disclosure.

With reference to FIG. 8 and FIG. 9, in order to assemble the permanent magnet assembly and the coil assembly together, the apparatus further includes a third coil holder. In this embodiment, since the second soft magnetic frame is of an integrally formed structure, the third coil holder 11 is of an integral structure. The third coil holder 11 includes a coil winding section configured to wind the coil and a left soft magnetic frame mounting section fixedly arranged at a left end of the coil winding section. An upper side surface of the coil winding section is concavely provided with an upper mounting cavity, and a lower side surface of the coil winding section is concavely provided with a lower mounting cavity. The first permanent magnet 6 is mounted in the upper mounting cavity and the second permanent magnet 7 is mounted in the lower mounting cavity. The coil winding section of the third coil holder 11 is clamped and fixed between the C-shaped structure and the fourth annular structure. The left soft magnetic frame mounting section of the third coil holder 11 is clamped and fixed in the C-shaped structure. The third coil holder 11 may be fixed through various specific fixing means, for example through a buckle structure or a limitation structure. Since the third lower soft magnetic plate 10-4 and the third upper soft magnetic plate 10-3 are both obliquely arranged, an upper side surface and a lower side surface of the left soft magnetic frame mounting section match the C-shaped structure in an inclined plane manner, such that the third coil holder 11 is mounted properly. The third coil holder 11 is provided with a third movable cavity 11-1 which penetrates the third coil holder left and right and is used for the soft magnetic plate 2 to pass therethrough. The soft magnetic plate is arranged in the third movable cavity in an up-down rotation manner, and a toggle end of the soft magnetic plate penetrates out of a position between the fourth lower soft magnetic plate and the fourth upper soft magnetic plate. An inner wall of the third movable cavity 11-1 is provided with two third fulcrum portions which are right opposite to each other and serve as rotating fulcrums of the soft magnetic plate 2. In order to toggle the soft magnetic plate 2 more conveniently and labor-saving, the toggle end of the soft magnetic plate 2 is sleeved with a toggle sleeve 3. Two connection arms of the toggle sleeve 3 are separately hinged on the second rear soft magnetic plate 10-8 and the second front soft magnetic plate 10-7, and the toggle sleeve 3 is provided with a flat spring 3-1.

A wireless switch of this embodiment includes a radio frequency control board, a switch body configured to control an electric device and the apparatus for self-generating power, wherein the coil of the apparatus for self-generating power is electrically connected to the radio frequency control board, and the coil in the apparatus for self-generating power generates currents to supply power to the radio frequency control board, thereby realizing passive wireless switch control.

The apparatus for self-generating power and the wireless switches applying same of the present disclosure have advantages of simple structure and convenient connection. The permanent magnet assembly and the coil assembly themselves are composed of few components, the closed magnetic circuit formed by the permanent magnet assembly and the coil assembly in cooperation is simple, thereby greatly improving production efficiency, reducing manufacturing cost, realizing high power generation efficiency, and achieving strong and sufficient current.

The above schematic description of the present disclosure and its embodiments are not restrictive. What is shown in the accompanying drawings is merely one of the embodiments of the present disclosure, and an actual structure is not limited thereto. Therefore, structural manners and embodiments which are similar to the technical solutions are designed, without creative efforts, by a person of ordinary skill in the art under inspiration by such embodiments without departing from the creative purposes of the present disclosure shall fall within the protection scope of the present disclosure.

What is claimed is:

1. An apparatus for self-generating power, comprising a coil assembly and a permanent magnet assembly, wherein the coil assembly comprises a soft magnetic plate and a coil, wherein the soft magnetic plate is arranged in an up-down rotation manner, and the coil is wound around a middle of the soft magnetic plate; the permanent magnet assembly comprises a first soft magnetic frame, a first left soft magnetic plate, a first permanent magnet and a second permanent magnet, wherein the first soft magnetic frame comprises a first upper soft magnetic plate, a first lower soft magnetic plate, a second lower soft magnetic plate a second upper soft magnetic plate, a first front soft magnetic plate and a first rear soft magnetic plate, wherein the first front soft magnetic plate and the first rear soft magnetic plate are arranged on a front side and a rear side of the soft magnetic plate respectively, the first upper soft magnetic plate and the first lower soft magnetic plate are oppositely arranged on an upper side and a lower side of a left end of the soft magnetic plate respectively, a left end of the first upper soft magnetic plate, a left end of the first lower soft magnetic plate, a left end of the first front soft magnetic plate and a left end of the first rear soft magnetic plate are connected together through the first left soft magnetic plate, a front end and a rear end of the first upper soft magnetic plate are fixedly connected to an upper left end of the first front soft magnetic plate and an upper left end of the first rear soft magnetic plate respectively, a front end and a rear end of the first lower soft magnetic plate are fixedly connected to a lower left end of the first front soft magnetic plate and a lower left end of the first rear soft magnetic plate respectively, the second upper soft magnetic plate and the second lower soft magnetic plate are oppositely arranged on an upper side and a lower side of a right end of the soft magnetic plate respectively, a front end and a rear end of the second upper soft magnetic plate are fixedly connected to an upper right end of the first front soft magnetic plate and an upper right end of the first rear soft magnetic plate respectively, and a front end and a rear end of the second lower soft magnetic plate are fixedly connected to a lower right end of the first front soft magnetic plate and a lower right end of the first rear soft magnetic plate respectively; the first permanent magnet is attracted to the first lower soft magnetic plate, the second permanent magnet is attracted to the second lower soft magnetic plate, or the first permanent magnet is attracted to the first lower soft magnetic plate and the second permanent magnet is attracted to the first upper soft magnetic plate; and in an initial state, the left end and the right end of the soft magnetic plate come into contact with the first permanent magnet and the second upper soft magnetic plate respectively to form a first closed magnetic circuit, and when the soft magnetic plate is rotated relative to the permanent magnet assembly, the left end and the right end of the soft magnetic plate come into contact with the first upper soft magnetic plate and the second permanent magnet respectively to form a second closed magnetic circuit, a direction of a magnetic line of force passing through the soft magnetic plate in the first closed magnetic circuit is opposite to that of a magnetic line of force passing through the soft magnetic plate in the second closed magnetic circuit; or in the initial state, the left end and the right end of the soft magnetic plate come into contact with the first permanent magnet and the second upper soft magnetic plate respectively to form a third closed magnetic circuit, and when the soft magnetic plate is rotated relative to the permanent magnet assembly, the left end and the right end of the soft magnetic plate come into contact with the second permanent magnet and the second lower soft magnetic plate respectively to form a fourth closed magnetic circuit, and a direction of a magnetic line of force passing through the soft magnetic plate in the third closed magnetic circuit is opposite to that of a magnetic line of force passing through the soft magnetic plate in the fourth closed magnetic circuit.

2. The apparatus for self-generating power according to claim 1, wherein the first upper soft magnetic plate and the second lower soft magnetic plate are both arranged obliquely with left higher than right, and the first lower soft magnetic plate and the second upper soft magnetic plate are both arranged obliquely with left lower than right.

3. The apparatus for self-generating power according to claim 1, wherein the first left soft magnetic plate is provided with a first hole for preventing the first left soft magnetic plate from interacting with the left end of the soft magnetic plate.

4. The apparatus for self-generating power according to claim 1, wherein a toggle sleeve sleeves a toggle end of the soft magnetic plate, wherein two connection arms of the toggle sleeve are separately hinged on the first front soft magnetic plate and the first rear soft magnetic plate, and the toggle sleeve is provided with a flat spring.

5. An apparatus for self-generating power, comprising a coil assembly and a permanent magnet assembly, wherein the coil assembly comprises a soft magnetic plate and a coil, wherein the soft magnetic plate is arranged in an up-down rotation manner, and the coil is wound around a middle of the soft magnetic plate; the permanent magnet assembly comprises a second soft magnetic frame, a first permanent magnet and a second permanent magnet, wherein the second soft magnetic frame comprises a third upper soft magnetic plate a third lower soft magnetic plate, a fourth lower soft magnetic plate and a fourth upper soft magnetic plate, wherein the third upper soft magnetic plate and the third lower soft magnetic plate are oppositely arranged on an upper side and a lower side of a left end of the soft magnetic plate respectively, a left end of the third upper soft magnetic plate and a left end of the third lower soft magnetic plate are connected through a second left soft magnetic plate, the third lower soft magnetic plate and the fourth lower soft magnetic plate are connected through a first lower soft magnetic plate, the fourth lower soft magnetic plate and the fourth upper soft magnetic plate are oppositely arranged on an upper side and a lower side of a right end of the soft magnetic plate, a rear end of the fourth lower soft magnetic plate and a rear end of the fourth upper soft magnetic plate are connected through a second rear soft magnetic plate, and a front end of the fourth lower soft magnetic plate and a front end of the fourth upper soft magnetic plate are connected through a second front soft magnetic plate the first permanent magnet is attracted to a lower surface of the third lower soft magnetic plate, and the second permanent magnet is attracted to an upper surface of the third upper soft magnetic plate; and in an initial state, the left end and the right end of the soft magnetic plate come into contact with the fourth upper soft magnetic plate and the first permanent magnet respectively to form a fifth closed magnetic circuit, and when the soft magnetic plate is rotated relative to the permanent magnet assembly, the left end and the right end of the soft magnetic plate come into contact with the fourth lower soft magnetic plate and the second permanent magnet to form a sixth closed magnetic circuit, and a direction of a magnetic line of force passing through the soft magnetic plate in the fifth closed magnetic circuit is opposite to that of a magnetic line of force passing through the soft magnetic plate in the sixth closed magnetic circuit.

6. The apparatus for self-generating power according to claim 5, wherein the third upper soft magnetic plate and the fourth lower soft magnetic plate are both arranged obliquely with left higher than right, and the third lower soft magnetic plate and the fourth upper soft magnetic plate are both arranged obliquely with left lower than right.

7. The apparatus for self-generating power according to claim 5, wherein a toggle sleeve sleeves a toggle end of the soft magnetic plate, wherein two connection arms of the toggle sleeve are separately hinged on the second rear soft magnetic plate and the second front soft magnetic plate, and the toggle sleeve is provided with a flat spring.

8. The apparatus for self-generating power according to claim 5, wherein the first lower soft magnetic plate is provided with an opening for the coil to be wound.

9. The apparatus for self-generating power according to claim 5, wherein the second left soft magnetic plate is provided with a second hole for preventing the second left soft magnetic plate from interacting with the left end of the soft magnetic plate.

10. A wireless switch, comprising a radio frequency control board, a switch body configured to control an electric device, and the apparatus for self-generating power of claim 1, wherein the coil of the apparatus for self-generating power is electrically connected to the radio frequency control board.

11. A wireless switch, comprising a radio frequency control board, a switch body configured to control an electric device, and the apparatus for self-generating power of claim 2, wherein the coil (1) of the apparatus for self-generating power is electrically connected to the radio frequency control board.

12. A wireless switch, comprising a radio frequency control board, a switch body configured to control an electric device, and the apparatus for self-generating power of claim 3, wherein the coil (1) of the apparatus for self-generating power is electrically connected to the radio frequency control board.

13. A wireless switch, comprising a radio frequency control board, a switch body configured to control an electric device, and the apparatus for self-generating power of claim 4, wherein the coil (1) of the apparatus for self-generating power is electrically connected to the radio frequency control board.

14. A wireless switch, comprising a radio frequency control board, a switch body configured to control an electric device, and the apparatus for self-generating power of claim 5, wherein the coil (1) of the apparatus for self-generating power is electrically connected to the radio frequency control board.

15. A wireless switch, comprising a radio frequency control board, a switch body configured to control an electric device, and the apparatus for self-generating power of claim 6, wherein the coil (1) of the apparatus for self-generating power is electrically connected to the radio frequency control board.

16. A wireless switch, comprising a radio frequency control board, a switch body configured to control an electric device, and the apparatus for self-generating power of claim 7, wherein the coil (1) of the apparatus for self-generating power is electrically connected to the radio frequency control board.

17. A wireless switch, comprising a radio frequency control board, a switch body configured to control an electric device, and the apparatus for self-generating power of claim 8, wherein the coil (1) of the apparatus for self-generating power is electrically connected to the radio frequency control board.

18. A wireless switch, comprising a radio frequency control board, a switch body configured to control an electric device, and the apparatus for self-generating power of claim 9, wherein the coil (1) of the apparatus for self-generating power is electrically connected to the radio frequency control board.

* * * * *